July 21, 1964

D. T. LOVELL 3,141,949

HIGH FATIGUE LIFE BRAZE-WELDED JOINT

Filed Nov. 9, 1962

2 Sheets-Sheet 1

INVENTOR.
DONALD T. LOVELL

BY ROY E. MATTERN Jr.

ATTORNEY

July 21, 1964            D. T. LOVELL            3,141,949

HIGH FATIGUE LIFE BRAZE-WELDED JOINT

Filed Nov. 9, 1962            2 Sheets-Sheet 2

INVENTOR.
DONALD T. LOVELL

BY ROY E. MATTERN Jr.

ATTORNEY

United States Patent Office 3,141,949
Patented July 21, 1964

3,141,949
HIGH FATIGUE LIFE BRAZE-WELDED JOINT
Donald T. Lovell, Bellevue, Wash., assignor to The Boeing Company, Seattle, Wash., a corporation of Delaware
Filed Nov. 9, 1962, Ser. No. 237,444
9 Claims. (Cl. 219—85)

This invention relates to welded structures and more particularly to lap joint structures which are spot welded. The instant application is a continuation-in-part application of my application Serial Number 857,372, filed December 4, 1959, now abandoned. In many applications, such structures have not been used because the fatigue life of spot welded joints was poor. This invention, therefore, is directed to overcoming this poor fatigue life of welded joints and concerns improvements of such joints by the inclusion of a brazing metal between the two basic overlapping metals forming the joint structure.

The successful practice of this invention gives the structural designer several advantages. The resulting brazed spot welded structure is lighter and stronger than those structures joined by using other separate fastening means such as rivet and bolt assemblies. Furthermore, such a structure withstands higher temperature environments and can be fabricated more economically.

Figure 5:
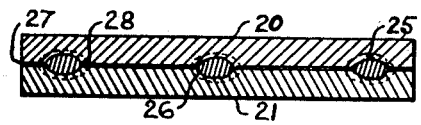
Figure 1:
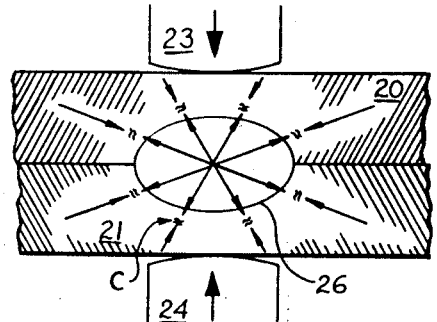
Figure 6:
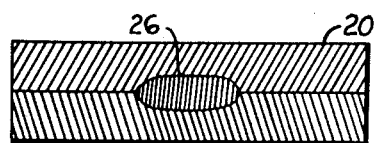
Figure 2:
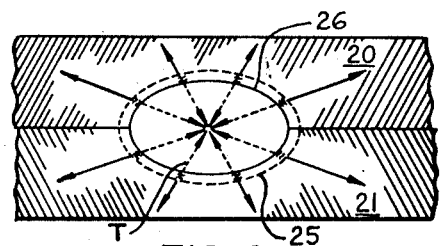
Figure 7:
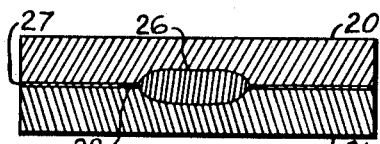
Figure 3:
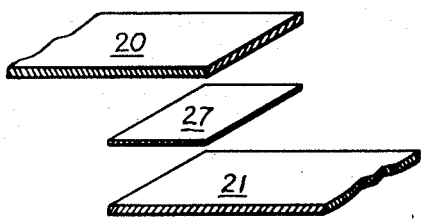
Figure 8:
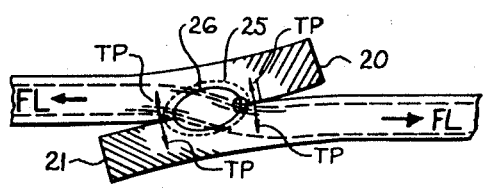
Figure 4:
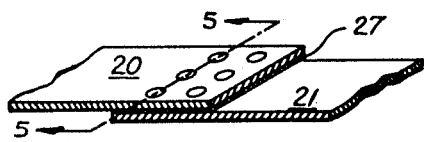
Figure 9:
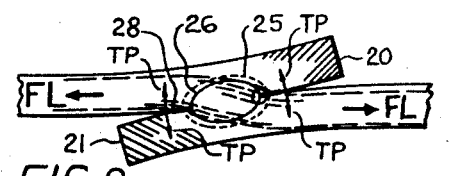
Figure 10:
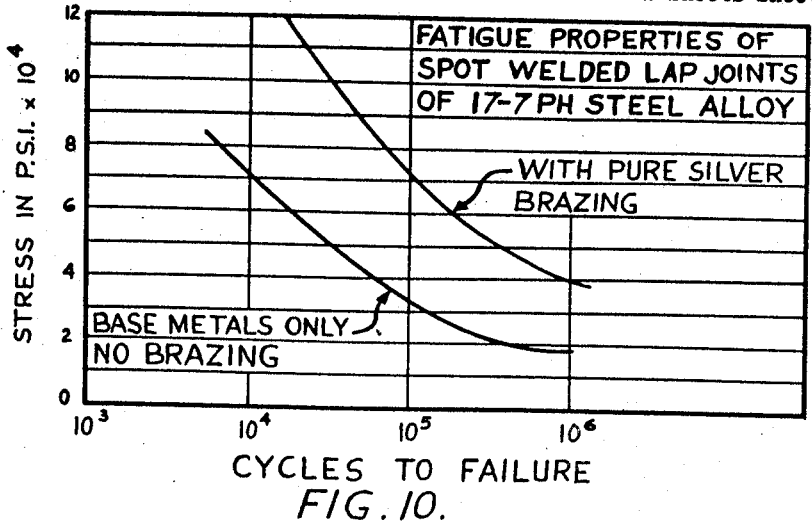
Figure 11:
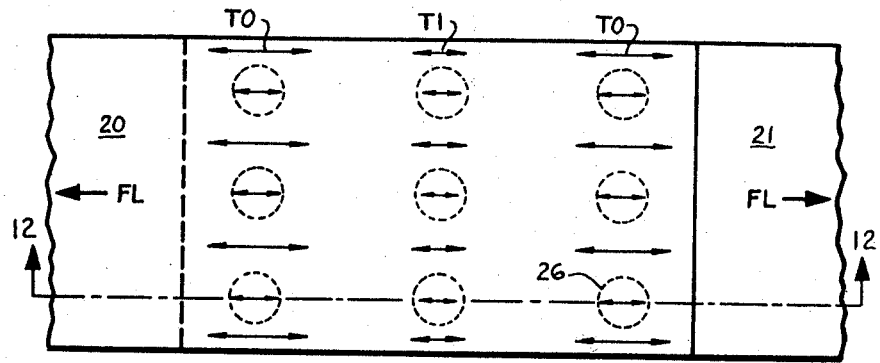
Figure 12:
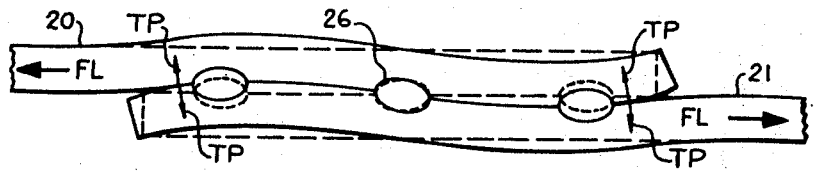

These advantages and others gained by the use of brazed-spot welding are better understood when reference is made to the following drawings in which:

FIG. 1 indicates the stress distribution during spot welding,

FIG. 2 shows the stress distributions after spot welding,

FIG. 3 concerns the components of a typical lap joint before assembly,

FIG. 4 shows the components of FIG. 3 assembled,

FIG. 5 is a section view taken on line 5—5 of FIG. 4 showing the resultant location of the brazing metal, FIG. 6 is the cross section through a resulting spot weld when no brazing metal is used during spot welding, FIG. 7 is a cross section through a resulting spot weld when brazing metal is used during spot welding, FIG. 8 concerns the stress distribution near and across the spot weld under a structural load when no brazing metal is used during spot welding, FIG. 9 shows the stress distribution near and across the spot weld under structural load when brazing metal is used during spot welding, FIG. 10 is a graph illustrating the increase in fatigue life obtainable when a spot weld joint includes brazed areas around the spot welds, FIG. 11 is a top view of a typical spot welded lap joint under load with stresses indicated, and FIG. 12 is a cross section of the joint of FIG. 11 taken on line 12—12.

The term "brazing" as used herein is not to be confused with the term "soldering," as is obvious from the high strength joints involved. Brazed joints are ten times stronger than solder joints. As taught in "Elements of Physical Metallurgy," by Albert G. Guy, January 30, 1959, p. 413, "solders have melting ranges below 800° F., while brazes melt above this temperature."

During the spot welding cycle, temperatures in the weld area vary from the melting temperature of the base metals to room temperature producing metallurgical changes, stresses and distortion in the resultant assemblies. As a particular spot weld grows in size until the heat cutoff point, as depicted in FIG. 1, large expansion stresses are developed because of both the confinement created by the joint 20–21 and the high electrode 23–24 pressures. These expansion stresses actually cause plastic yielding and upsetting of the base metal 20–21 in "heat affected area 25" around the "fused area 26." Then as cooling occurs and contraction takes place stress relief of the upset base metal in the "heat affected area" does not occur. The still mushy zone of the "fused area" remains weaker long enough so that no relief is obtained to reduce the strain in the upset metal and tension stresses "T" just below the yield point remain.

These tension stresses T have discouragingly drastic effects on fatigue life of spot welded structure and prior attempts to overcome this deficiency have centered on: the design of the joints themselves based upon proper knowledge of the characteristics of the metal being welded, better fixtures and tools, and more refined process controls. Yet even with the success afforded by these attempts the final structure is often still undesirably preloaded in the "heat affected area 25" before external loads are applied, as illustrated in FIG. 2. The total tensile stresses produced by both the preloads and external loads, are especially undesirable in spot welded structures because the small, local, rigid, cast areas of the spot welds act as stiff columns and fail to provide any slack in the joint, as compared to the slack provided by riveted and/or bolted joints.

However, the severity of these stress concentrations in the "heat affected area 25" is reduced by the presence of brazed structure 27 between and contiguous with the faying or adjacent surfaces of the primary metal components 20–21; such brazed structure 27, by absorbing and spreading out the fatigue stresses, substantially improves the fatigue life. A typical lap joint of this brazed, spot welded structure is illustrated in FIG. 3 by the components prior to assembly, in FIG. 4 by the components after the assembly and in FIG. 5 by the section view taken along line 5—5 of FIG. 4. Although the brazing material 27 is shown as an independent component such as a foil sheet, it could be associated with the base metals 20–21 by plating, rolling, or other suitable processes.

The heat for the brazing is obtained from the heat input required to produce the spot weld. Therefore, the brazing temperature of the insert 27 should be sufficiently lower than the melting temperature of the metals 20–21 to assure that a good brazed structure will be obtained around the spot weld 26. Also the brazing material 27 should have a high ductility to successfully carry and transmit fatigue stresses. The base materials utilized are those formerly used and may ultimately include others. Likewise, the brazing materials used are any of those now being employed for brazing and may also ultimately include others. To insure a strong joint, as ten times stronger than a soldered joint, the braze material is required to have a melting temperature above 800° F., particularly for forming a true secure braze connection. Other points of consideration in the selection of brazing and base metals are: their affinity one for the other, and/or their possible adverse properties that might cause for example: corrosion, pitting and/or formation of undesirable alloys.

The resulting annulus of brazed metal 28 around the periphery of each welded fused zone 26 and between the base metals 20–21 if properly selected and used, has no deleterious effect on the weld itself as illustrated in FIGS. 6 and 7. The area of the weld fused zone 26 can be maintained substantially the same by proper adjustment of the welding process. Added care, however, is required in preparing the faying surfaces prior to welding, for cleanliness of the respective parts is very important. While both higher pressures and temperatures are required when brazing material is used, the basic tooling setup remains essentially the same.

FIGS. 8 and 9 shows how the stress pattern throughout a spot welded joint is altered beneficially by the utilization of a brazing material. In FIG. 8, where there is no brazing, high stress concentrations result in the critical "heat affected area 25." Whereas, in FIG. 9 the brazed area produced around the spot weld offers a means of absorbing and/or spreading out, the stresses encountered under fatigue conditions reducing the high stress concentrations around the fused area 26.

The beneficial effect of brazed spot welding is more forcefully indicated in FIG. 10 by the relationship of the curves on the graph. The ordinate indicates the stress applied and the abscissa indicates the fatigue cycles occurring until failure. Regardless of the stress range, the curves illustrate that brazed spot weld structure has a longer fatigue life than similar structure not having brazed areas around the spot welds. Although the curves are based on data obtained from testing 17-7PH stainless steel alloy base materials 20-21 and pure silver brazing materials 27, the results are very typical. Especially notable have been the results of using silver as a brazing material in conjunction with titanium.

Also the beneficial effects of such brazed spot welded structures are realized whether the lap joint has one, two, three or more rows of spot welds. Under multiple row conditions, the benefits derived are even greater than might otherwise be expected. In FIGS. 11 and 12, a lap joint is shown having three rows of three spot welds apiece. The inner row, as formerly was true without brazing, does not carry its proportionate share of the load. The tension in the outer row TO is greater than the tension in the inner row TI. However, when the lap joints are assembled by brazed spot welding, the inner row assumes a greater proportion of the loading. Where test specimens previously failed at the first row of spot welds without brazing, they now fail near the center of the joint (inner row of spot welds) indicating that the stress concentrations are not as high in the first row of spot welds in the specimens brazed spot welded.

FIGS. 9 and 12, show in more detail, by employing stress indicating lines, how the presence of the brazed structure 28 in the heat affected area 25 causes a favorable stress distribution postponing the destructive effects of the peeling tension forces, TP, until either higher fatigue loads FL are applied and/or they are applied for a longer number of cycles. Also, where distortion of the joint occurs as shown in these figures, the bending stresses that are added to the peeling forces TP are likewise subjected to this favorable distribution.

For these reasons, brazed surrounded spot welded lap joints structures are relied upon today, where former spot welded structures were considered of no value when satisfactory fatigue life was of paramount importance, giving the structural designers the opportunity to fully exploit all the other potential benefits of spot welded structure such as lower weight, greater economy, and more extensive use in high temperature environments.

I claim as my invention:

1. A structural weld joint of improved fatigue life comprising two load carrying base materials welded by fusing opposite portions thereof, and brazing material brazed to the base materials joining them along their faying surfaces around the fused area of the weld, said brazing material having a melting point greater than 800° F.

2. Spot welded structure having an improved fatigue life comprising base metals with adjoining surfaces, fusion welds joining the base metals at selective places on the adjoining surfaces, and metal brazed between the base metals around the fusion welds between the adjoining surfaces, said brazing metal having a melting point greater than 800° F.

3. Brazed-spot welded structure having an improved fatigue life in comparison with spot welded structure comprising at least two base metals welded together, and an additional metal brazed between the base metals around the welds, said brazing metal having a melting point greater than 800° F.

4. A method of fastening two metal shapes together comprising overlapping their edge portions, holding brazing metal having a melting temperature greater than 800° F. between such edge portions, passing welding current through all the metals to establish fusion weld areas immediately surrounded by brazed areas.

5. A method of spot welding which consists of placing the faying surfaces of multiple metals together, the metals being alternately arranged for structural and brazing purposes with a braze having a melting point greater than 800° F., and spot welding through the multiple metals forming fusion areas of the structural metal surrounded by brazed areas joining the structural metals together.

6. A method of fastening multiple pieces of structural metal together by providing brazing metals having a melting point greater than 800° F. on at least one of every two faying surfaces to be joined together; placing the faying surfaces of the multiple pieces of structural and brazing metals in contact with one another on a welding machine; and welding and brazing the metals together simultaneously by the application of pressure and electric heating current.

7. An improved welded structure comprising, two adjacent structural sections having two adjacent surfaces, a layer of brazing material having a melting point greater than 800° F. positioned between said structural sections and contiguous with said adjacent surfaces, a welded fused zone between said adjacent surfaces, and a brazed structure brazed to said two adjacent structural sections and formed from said brazing material of substantial width around the periphery of said welded fused zone.

8. An improved welded structural joint comprising, two contiguous structural pieces, a welded fused zone interconnecting said pieces, and an annular brazed structure brazed between said structural pieces and around the periphery of said welded fused zone, said brazed structure having a melting point greater than 800° F.

9. A method of welding two contiguous pieces of structural metal together comprising, positioning a brazing material having a melting point greater than 800° F. between said structural metal pieces, welding together with heat a portion of said two structural metal pieces to form a welded fused zone interconnecting said pieces, and brazing together with said same heat a portion of said two structural metal pieces around the periphery of said welded fuse zone.

References Cited in the file of this patent

UNITED STATES PATENTS

| 1,865,051 | Trane | June 28, 1932 |
| 1,934,673 | Klemperer | Nov. 7, 1933 |
| 2,223,312 | Briggs | Nov. 26, 1940 |
| 2,481,614 | Redmond | Sept. 13, 1949 |
| 2,941,064 | Gieser et al. | June 14, 1960 |
| 3,005,086 | Watter | Oct. 17, 1961 |